(12) United States Patent
Srighakollapu et al.

(10) Patent No.: US 12,198,535 B2
(45) Date of Patent: Jan. 14, 2025

(54) METHODS AND APPARATUS TO IMPLEMENT OFF-SCREEN INDICATION OF BATTERY CHARGE STATUS IN MOBILE PLATFORMS

(71) Applicant: Intel Corporation, Santa Clara, CA (US)

(72) Inventors: N. V. S. Kumar Srighakollapu, Bengaluru (IN); Ankur Mishra, Bangalore (IN); Sreejith Satheesakurup, Cherthala (IN); Saunak Bhalsod, Ahmedabad (IN)

(73) Assignee: INTEL CORPORATION, Santa Clara, CA (US)

( * ) Notice: Subject to any disclaimer, the term of this patent is extended or adjusted under 35 U.S.C. 154(b) by 79 days.

(21) Appl. No.: 17/955,384

(22) Filed: Sep. 28, 2022

(65) Prior Publication Data

US 2023/0020672 A1 Jan. 19, 2023

(51) Int. Cl.
| | |
|---|---|
| *G06F 1/32* | (2019.01) |
| *G06F 1/3212* | (2019.01) |
| *G06F 3/02* | (2006.01) |
| *G08B 5/36* | (2006.01) |

(52) U.S. Cl.
CPC ............. *G08B 5/36* (2013.01); *G06F 1/3212* (2013.01); *G06F 3/0227* (2013.01)

(58) Field of Classification Search
CPC ................ G06F 1/32; G06F 9/44; G06F 1/12
See application file for complete search history.

(56) References Cited

U.S. PATENT DOCUMENTS

| | | | | |
|---|---|---|---|---|
| 2012/0316811 | A1* | 12/2012 | Choi | ..................... G06F 1/3212 |
| | | | | 702/63 |
| 2014/0216113 | A1* | 8/2014 | Hogan | ............... G07C 9/00174 |
| | | | | 70/432 |
| 2021/0089326 | A1* | 3/2021 | Banik | ..................... G06F 1/263 |

* cited by examiner

*Primary Examiner* — Keshab R Pandey
(74) *Attorney, Agent, or Firm* — Hanley, Flight & Zimmerman, LLC

(57) ABSTRACT

Methods, apparatus, systems, and articles of manufacture are disclosed that implement an off-screen indication of battery charge in mobile platforms. In an example, the apparatus includes a keyboard, an interface circuitry, and a processor circuitry. The example processor circuitry to instantiate remaining state of charge (RSOC) controller circuitry to detect a battery charge level display event on a mobile device, the mobile device in a pre-boot state. The example processor circuitry additionally to instantiate fuel gauge circuitry to determine a charge level of a battery of the mobile device and keyboard display circuitry to, after the battery charge level display event, cause a display of the charge level of the battery in the pre-boot state with ones of backlights of a second ones keys on the keyboard.

24 Claims, 11 Drawing Sheets

METHODS AND APPARATUS TO IMPLEMENT OFF-SCREEN INDICATION OF BATTERY CHARGE STATUS IN MOBILE PLATFORMS

FIELD OF THE DISCLOSURE

This disclosure relates generally to the battery status in mobile platforms and, more particularly, to methods and apparatus to implement off-screen indication of battery charge status in mobile platforms.

BACKGROUND

In current mobile computing devices, such as laptop computers, users generally check a remaining state of charge (RSOC) of the battery after booting to the operating system (OS). In laptops, as well as other mobile computing devices, there are normally several low power states, such as Hibernate and various states of Sleep, that provide power savings without completely powering down all subsystems within the mobile computing device.

Figure 1:
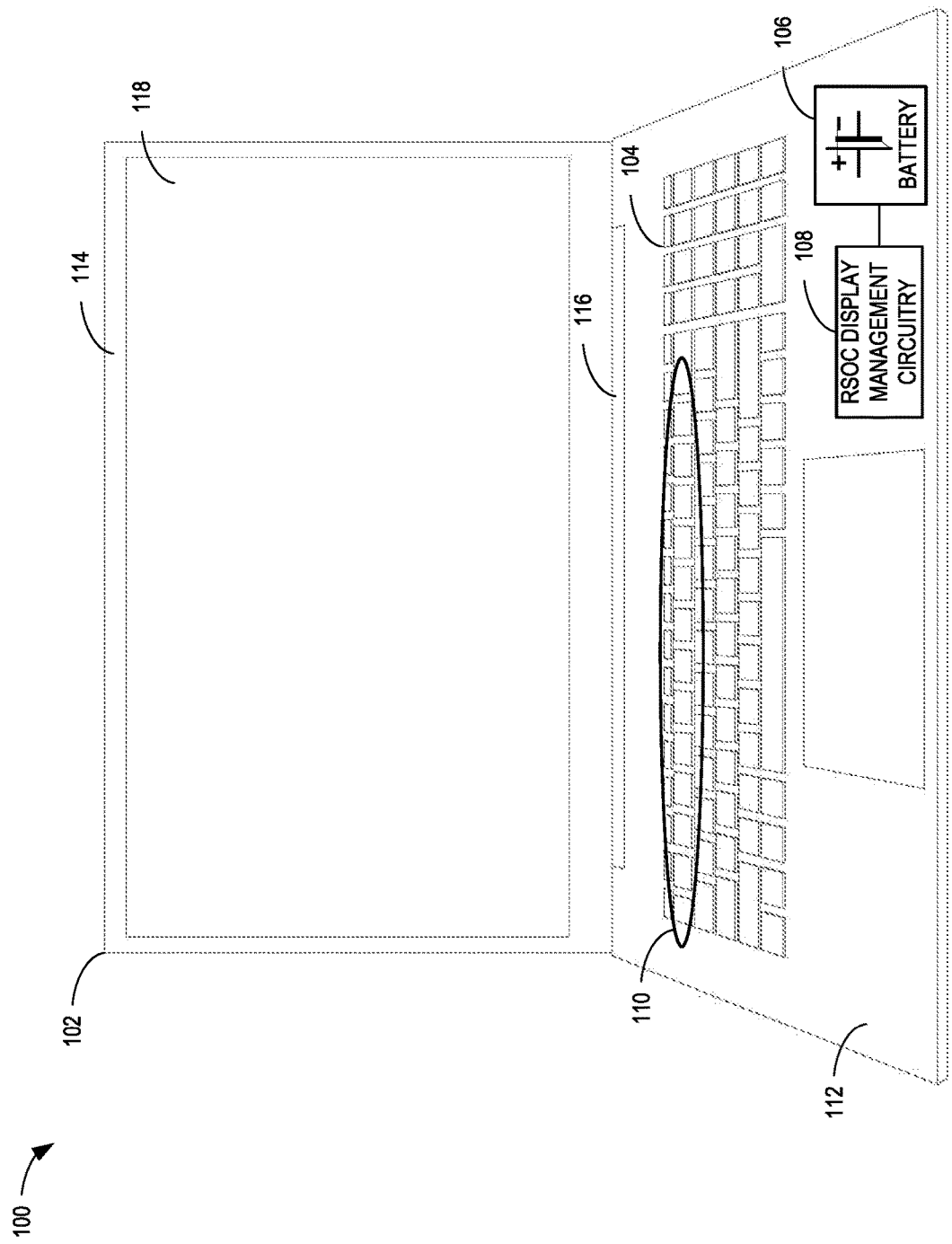
FIG. 1 is a block diagram of an example system 100 to implement an off-screen indication of battery charge status in mobile platforms.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A mobile computing device, such as a laptop, generally has one or more batteries to power internal components when such a device is not plugged in to a power source. It is generally beneficial for a user to know the charge level of a battery in a mobile computing device, such as for planning how long the device can maintain functionality while on battery power before the user is required to plug the device into a power source. In some examples, a laptop may need to enter a different power state before the charge level of the battery in the laptop can be displayed. For example, to see a specific charge level of a battery, a laptop may need to transition out of a low power mode, including, in some circumstances, requiring a full boot sequence of an operating system on the laptop, which may take time. In some examples, a blinking LED (light emitting diode) near the laptop's charging port or near the laptop's power button is provided to notify the user about a critical charge level for the battery. While a user may determine the charge level of the battery is low due to the blinking LED, such an indicator does not provide a percentage of charge of the battery.

In some laptops, during power-on, the laptop display turns on temporarily to show a low battery icon to indicate a low battery status. Eventually the display turns-off and the laptop powers down if the user does not plug in a power adapter. Turning on the display showing a low battery icon results in additional power consumption and still does not display a battery remaining state of charge percentage (RSOC %) when the laptop has not booted into an operating system. As used herein, the RSOC % may alternatively be described as a charge level of a battery. Additionally, if the laptop is in hibernate, or another low power state, and then is forced to turn-on with a low battery, this can cause a hard shutdown of the system and unsaved data may be lost.

Examples disclosed herein implement an off-screen indication of a battery charge status in mobile platforms. As used herein, a "mobile platform" may be a laptop, a tablet, a cellular phone, etc. and the term mobile platform may be used interchangeably with a "mobile system," a "mobile computing device," a "mobile device," or any other similar word or phrase that can be used to describe such devices. The examples described herein use a laptop computer as the mobile platform in question, though, it should be noted that another type of mobile platform may be used instead that also has similar low battery indicator issues. In some examples, a laptop may inform/display the RSOC % or approximate RSOC % to the user in a visually clear and power efficient manner. As used herein, "approximate" RSOC % means a percentage that is less granular than the RSOC % that would be displayed when the operating system has booted and the battery charge percentage is accessible through the operating system user interface or otherwise. For example, if the operating system is capable of reporting single digit RSOC % from 0-100% in increments of 1%, an approximate RSOC % may include reporting double digit RSOC % from 0-100% in increments of 10% (or in increments of 5% or other such similar increments).

Examples disclosed herein provide an RSOC % indicator through the use of keyboard backlights implemented on a laptop. As used herein, a keyboard backlight is an LED or other small light that lights up the keyboard from behind each key (or at least from behind several keys). For example, a keyboard backlight may illuminate keys by LED illumination through translucent letters in the keys, through an LED point of light in a portion of the surface of the keys, or through ambient LED light that provides a glowing illumination around the edges of the keys, among other implementations. Examples disclosed herein receive keyboard input from a user, in which the user may simultaneously press unique combinations of keys to solicit an indicator response. For example, simultaneously pressing the letter keys B+A+T, or any other unique key combinations may generate a response from the laptop through the illumination of one or more keyboard backlights, irrespective of the power state of the mobile platform.

In some examples, an embedded controller in the mobile platform, such as one located on a laptop motherboard, will receive an input indicating the key combination has been pressed, which may trigger the embedded controller to read the RSOC % of the battery by communicating with a battery fuel gauge controller. For example, a battery fuel gauge controller may be an embedded controller, located inside or outside of a battery of a laptop or other mobile computing device, that performs functions related to the battery. In some examples, the battery fuel gauge controller may determine the RSOC % and communicate that information to the embedded controller. In some examples, the embedded controller then may cause one or more keyboard backlights to illuminate for a short period of time, which may be designed to be understood as a form of visual fuel gauge being reported on portions of the keyboard. Examples disclosed herein may include color-coded LED keyboard backlight indicators to further visualize the level of criticality of the RSOC %. For example, red backlights may mean a low charge state, yellow backlights may mean a medium charge state, and green backlights may mean a high or full charge state of the battery. In some examples, the keyboard key combination (e.g., B+A+T, etc.) and/or the types and appearance of the keyboard backlight RSOC % indicators may be user definable/modifiable by values set in the embedded controller, in a BIOS (basic input/output system), and/or in the operating system.

FIG. 1 is a block diagram of an example system 100 to implement an off-screen indication of battery charge status in mobile platforms. The example system 100 includes a mobile platform (e.g., a mobile compute device), such as a laptop computer 102. However, in some examples, the mobile platform may include a tablet computer, a cellular phone, a personal digital assistant, or another type of mobile device that is battery-powered when the system 100 is not plugged in to an alternative power source (e.g., an alternative power source may be 110-volt wall outlet, an external battery back-up device, or otherwise).

The example laptop computer 102 (as used herein, "laptop 102") includes a keyboard 104. In some examples, the keyboard 104 includes one of many keyboard layouts, such as a QWERTY keyboard layout or another type of keyboard layout. In some examples, the keyboard layout includes alphabetical letters in the QWERTY format and a set of number keys in a row above the alphabetical letters. In some examples, the number keys include the numbers 1-9 and 0 in left to right order.

In the illustrated example of FIG. 1, the keyboard 104 includes a group of battery charge display keys 110 that are enabled to visually show the RSOC % of a battery 106 in the laptop 102. For example, the battery charge display keys 110 may include the number keys 1-9 and 0. In some examples, the battery charge display keys 110 include additional and/or alternative keys other than the number keys 1-9 and 0. For example, the tilde key ("~") may be included as an alternative key that may be used with the number keys 1-9 and 0. In some examples, the keys on the keyboard 104 include backlights, such as LED backlights or other implemented backlight light sources. The backlights on the example keyboard 104 may make the keys visually clear for a user of the laptop 102. In some examples, the entire keyboard or a portion that at least includes the letter keys and number keys are implemented with individual backlights, per key. In some examples, the keyboard 104 includes a primary power source to power the backlights. In such examples, each of the keyboard backlights will either be on or off. In some examples, some or all of the keyboard backlights include a multi-color LED or other multi-color light source that enables such backlights to emit one or more colors including white light (e.g., red, yellow, green, blue, white, etc.). Furthermore, in some examples, the keyboard backlights include a variable brightness, which can brighten or dim the luminescence of each backlight light source. In some examples, the functionality of the keyboard backlights can be individually programmable and/or configurable (e.g., whether each backlight is off or on, the color of each backlight, and the brightness of each backlight).

In the illustrated example, the battery charge display keys 110 may include a secondary set of backlights, to enhance the functionality of the visual indicators of such keys. For example, the keyboard 104 may have a set of white backlights for all keys that have a single brightness level and are only configurable to be turned off or on, and, supplementing the white backlights, the battery charge display keys 110 may include a secondary set of multi-color backlights (or a secondary set of single color backlights that are a color other than white) to distinguish such keys from the other keys on the keyboard 104. It should be appreciated that, in some examples, any other type of configurable backlight or backlights per key in the set of battery charge display keys 110 may be implemented to provide distinguishable visual clarity against a backdrop of the other keys on the keyboard 104. In some examples, the keyboard 104 does not have general backlights for all keys, but rather, only backlights for the battery charge display keys 110.

In some examples, when a key is pressed on the keyboard 104, the key closes a circuit of a wire trace that originates out of a keyboard controller or other control mechanism (and routed through a key switch component under the key surface that closes and opens the wire trace circuit). The example closed circuit registers an electrical signal associated with the pressed key, providing an input signal to the keyboard controller that the key is pressed. In some examples, the keyboard controller then registers the input of the letter, number, or symbol corresponding to the pressed key. In some examples, if a key is pressed and held down, the keyboard controller and/or other control mechanism registers a continuous pressed key. In some examples, if multiple keys are pressed down concurrently, a key combination is registered. For example, in many situations, a key combination of the CTRL key, the ALT key, and the DELETE key register a combination that causes Microsoft® Windows® based computers to perform one or more special operations.

In the illustrated example of FIG. 1, the laptop includes the rechargeable battery 106. For example, the battery 106 may be a lithium ion (Li-ion) battery, a nickel cadmium (NiCd) battery, a nickel metal hydride (NiMH) battery, or any other type of rechargeable battery available for use to power mobile computing platforms, such as the laptop 102. In some examples, the laptop 102 includes RSOC display management circuitry 108. The example RSOC display management circuitry 108 enables the management of displaying the current charge level of the battery 106 to a user. In some examples, the RSOC display management circuitry 108 causes the battery charge display keys 110 to visually convey such a battery charge state through the use of one or more of the keyboard 104 backlights for the battery charge display keys 110. For example, if the battery 106 is at a 50% state of charge, the RSOC display management circuitry 108 may cause the backlights of the battery charge display keys 110 to visually indicate a 50% charge. In some examples, the visual indicator of a 50% charge includes modifying the backlight of the number "5" key to increase in brightness and/or present the number "5" key in a different color (e.g., orange vs. the white backlights of the other keys on the keyboard 104). Details of several visual display aspects of the battery charge display keys 110 will be discussed below in connection with FIG. 4.

In the illustrated example in FIG. 1, the laptop 102 includes a base casing 112. The example base casing 112 is a cover for internal components of the laptop 102, including, for example, a motherboard. In some examples, the keys of the keyboard 104 protrude from the base casing 112. In some examples, the base casing 112 is coupled to a display casing 114 via a hinge 116. The example display casing 114 houses a display panel 118. For example, the display panel 118 may be a twisted nematic (TN) panel, an in-plane switching (IPS) panel, an organic light emitting diode (OLED) panel, or another type of display panel that is capable of displaying content in a laptop. In some examples, the laptop 102 may be in one of at least two configurations: an open configuration and a closed configuration. For example, an open configuration means the display casing 114 is rotated into an open position to allow a user to see the display 118 and type on the keyboard 104. The example display casing 114 may be at any one of a number of angles relative to the base casing 112 while in an open configuration with the only limitation being that the display casing 112 should be open enough to allow for the user to see the display panel 118 and use the keyboard 104. For example, a closed configuration means the display casing 114 is rotated into a closed position for ease of transport of the laptop 102 and to protect the keyboard 104 and the display panel 118 from errant contact and damage. In some examples, the keyboard 104 and the display panel 118 are adjacent to each other (e.g., the X-Y plane of the keyboard 104 and the X-Y plane of the display panel 118 are parallel and in close proximity).

Figure 2:
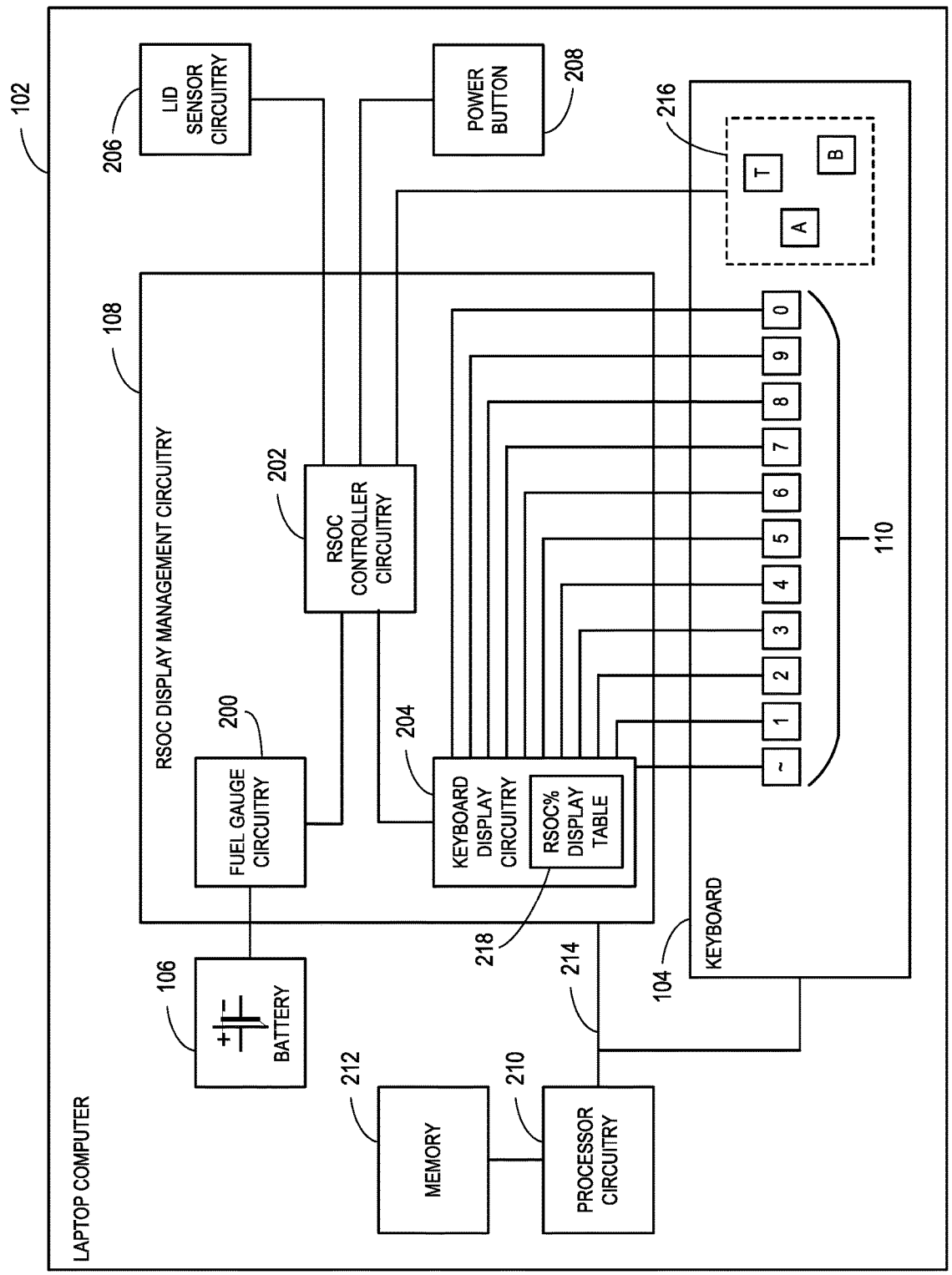
FIG. 2 is a block diagram of an RSOC display management circuitry 108 to implement an off-screen indication of battery charge status in mobile platforms.

FIG. 2 is a block diagram of the RSOC display management circuitry 108 to implement an off-screen indication of battery charge status in mobile platforms. The RSOC display management circuitry 108 of FIGS. 1 and 2 may be instantiated (e.g., creating an instance of, bring into being for any length of time, materialize, implement, etc.) by processor circuitry such as a central processing unit executing instructions. Additionally or alternatively, the RSOC display management circuitry 108 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example of FIG. 2, the laptop 102 from FIG. 1 includes the keyboard 104, the battery 106 and the RSOC display management circuitry 108. In some examples, the RSOC display management circuitry 108 includes a fuel gauge circuitry 200, an RSOC controller circuitry 202, and a keyboard display circuitry 204. Additionally, the laptop 102 includes a lid sensor circuitry 206, a power button 208, a processor circuitry 210 and a memory 212.

Figure 8:
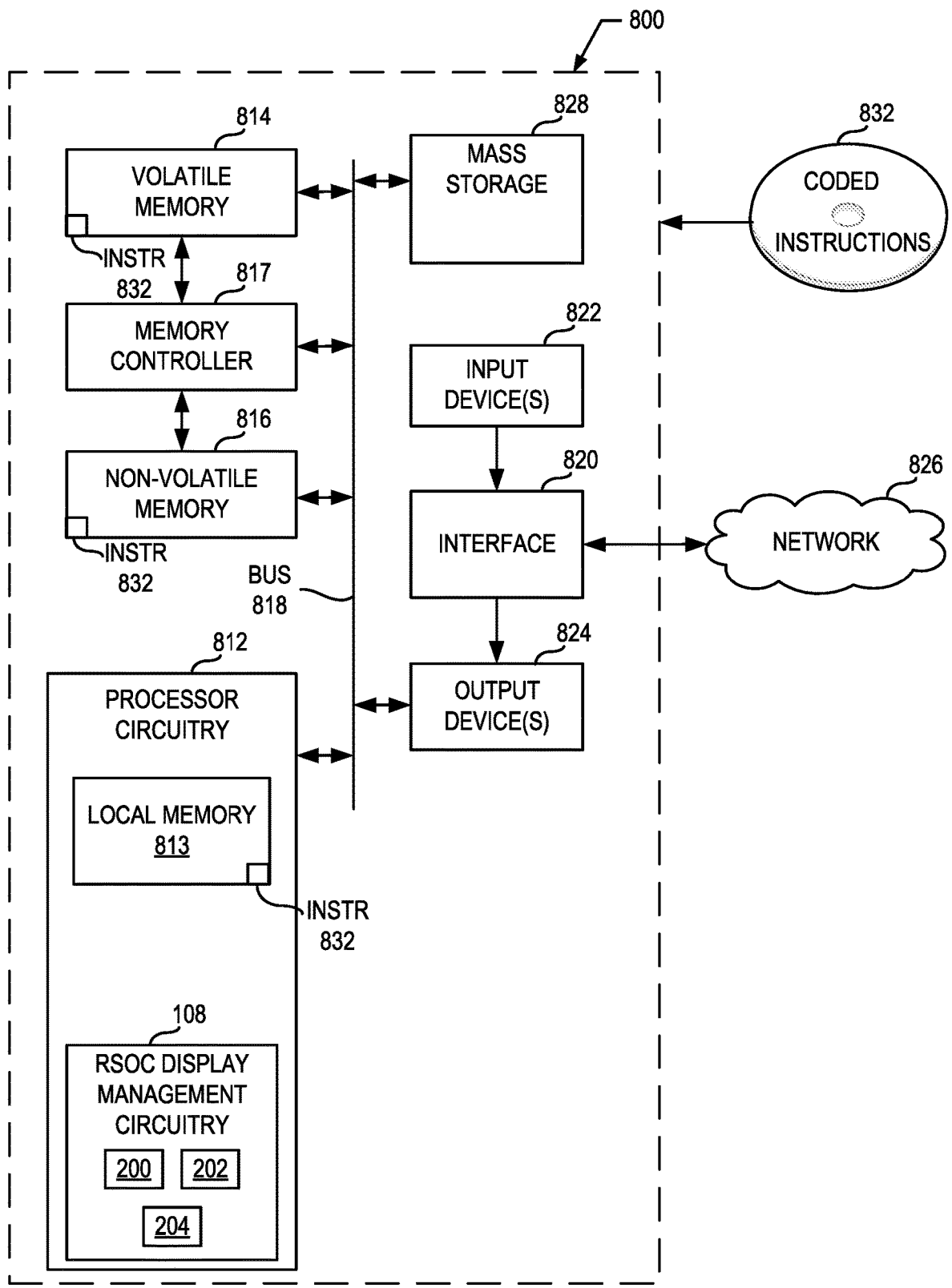
FIG. 8 is a block diagram of an example processor platform structured to execute and/or instantiate the machine readable instructions and/or the operations of FIGS. 5-7 to implement the RSOC display management circuitry of FIGS. 1 and 2.

In some examples, the processor circuitry 210 may be the same as, similar to, different from, or complementary to processor circuitry 812 in FIG. 8. In some examples, the RSOC display management circuitry 108 is integrated into the processor circuitry 210. However, in other examples, the RSOC display management circuitry 108 is a discrete embedded controller or other circuitry located on a motherboard within the laptop 102. In some examples, the processor circuitry 210 is communicatively coupled to the memory 212 over the interface 214. In some examples, the processor circuitry 210 and the RSOC display management circuitry 108 are communicatively coupled over an interface 214 to the keyboard 104. In some examples, the interface 214 may be a single interface capable of carrying signals that include information/communications between circuitry within the laptop 102. However, in some examples, the interface 214 may be a combination of multiple interfaces that are communicatively coupled together and enable the transmission of signals that include information/communications across two or more of the interfaces. The example interface 214 includes interface circuitry to communicatively couple the processor circuitry 210 and the memory 212. The example memory 212 may include dynamic random access memory (DRAM), static random access memory (SRAM), a cache memory, a buffer, non-volatile memory, a storage device, or any one or more other forms of memory that provide data storage. The example interface 106 may include one or more types of interfaces implemented by hardware in accordance with one or more interface standards, such as IEEE (Institute of Electrical and Electronics Engineers) or JEDEC (Joint Electron Device Engineering Council) high speed memory interfaces, a Peripheral Component Interconnect Express (PCIe) interface, or any other interface capable of sending and receiving data between processor circuitry 102 and the memory 104.

In the illustrated example, the RSOC display management circuitry 108 includes the fuel gauge circuitry 200. The example fuel gauge circuitry 200 analyzes the battery 106 and provides information, based on the analysis, on the RSOC % of the battery 106. The example fuel gauge circuitry 200 predicts the remaining capacity by measuring the voltage, battery temperature, and current of the battery 106. In some examples, the fuel gauge circuitry 200 includes sensors to measure the voltage, battery temperature, and current, as well as integrated circuitry to input the measurements into an algorithm designed to determine the RSOC % of the battery 106. For example, the fuel gauge circuitry 200 may determine the RSOC % using the battery voltage. The battery voltage is then compared to an internal lookup table that includes an array of data such as voltage ratios. For example, the fuel gauge circuitry 200 may determine the RSOC % based on counting coulombs by measuring the energy that flows into and out of the battery 106. In some examples, the fuel gauge circuitry 200 may, alternatively, use another method for determining the RSOC % of the battery 106.

The example fuel gauge circuitry 200 may compare the current RSOC % of the battery 106 to a critical charge level threshold. For example, the critical charge level threshold may be defined as a charge level of the battery 106 being at or below 10% of a full battery charge. However, in some examples, the critical charge level threshold may be defined at or below a percentage other than 10%. In some examples, the critical charge level threshold may be user configurable/definable (e.g., in a BIOS setting, in an operating system setting, etc.). The example fuel gauge circuitry 200 may periodically check/determine the RSOC % of the battery 106 and then compare the determined RSOC % to the critical charge level threshold. In some examples, the fuel gauge circuitry 200 may continuously check by dynamically monitoring voltage, coulombs, and/or other statistics over time and maintaining a triggering value that flags integrated circuitry within the fuel gauge circuitry 200 once a monitored value dips below the triggering value (e.g., the critical charge level threshold). In some examples, when the critical charge level threshold is satisfied (e.g., the currently monitored value(s) from the battery are at or below a minimum value), the fuel gauge circuitry 200 sends an indication to the RSOC controller circuitry 202. In some examples, the indication is a message/packet/communication transmitted across a bus or interconnect, such as an I2C bus that communicatively couples the fuel gauge circuitry 200 with the RSOC controller circuitry 202.

In some examples, the fuel gauge circuitry 200 sets an indicator flag of a system variable that indicates the RSOC % has satisfied a critical charge level threshold (e.g., the indicator flag is the indication that is sent). For example, the fuel gauge circuitry 200 may set a CRITICAL_BATTERY_INDICATOR system variable to 1 when (e.g., after) the currently measured RSOC % satisfies the critical charge level threshold. In such examples, the fuel gauge circuitry 200 may clear the CRITICAL_BATTERY_INDICATOR system variable (e.g., set the CRITICAL_BATTERY_INDICATOR system variable to 0) when the currently measured RSOC % does not satisfy (e.g., no longer satisfies) the critical charge level threshold.

Figure 5:
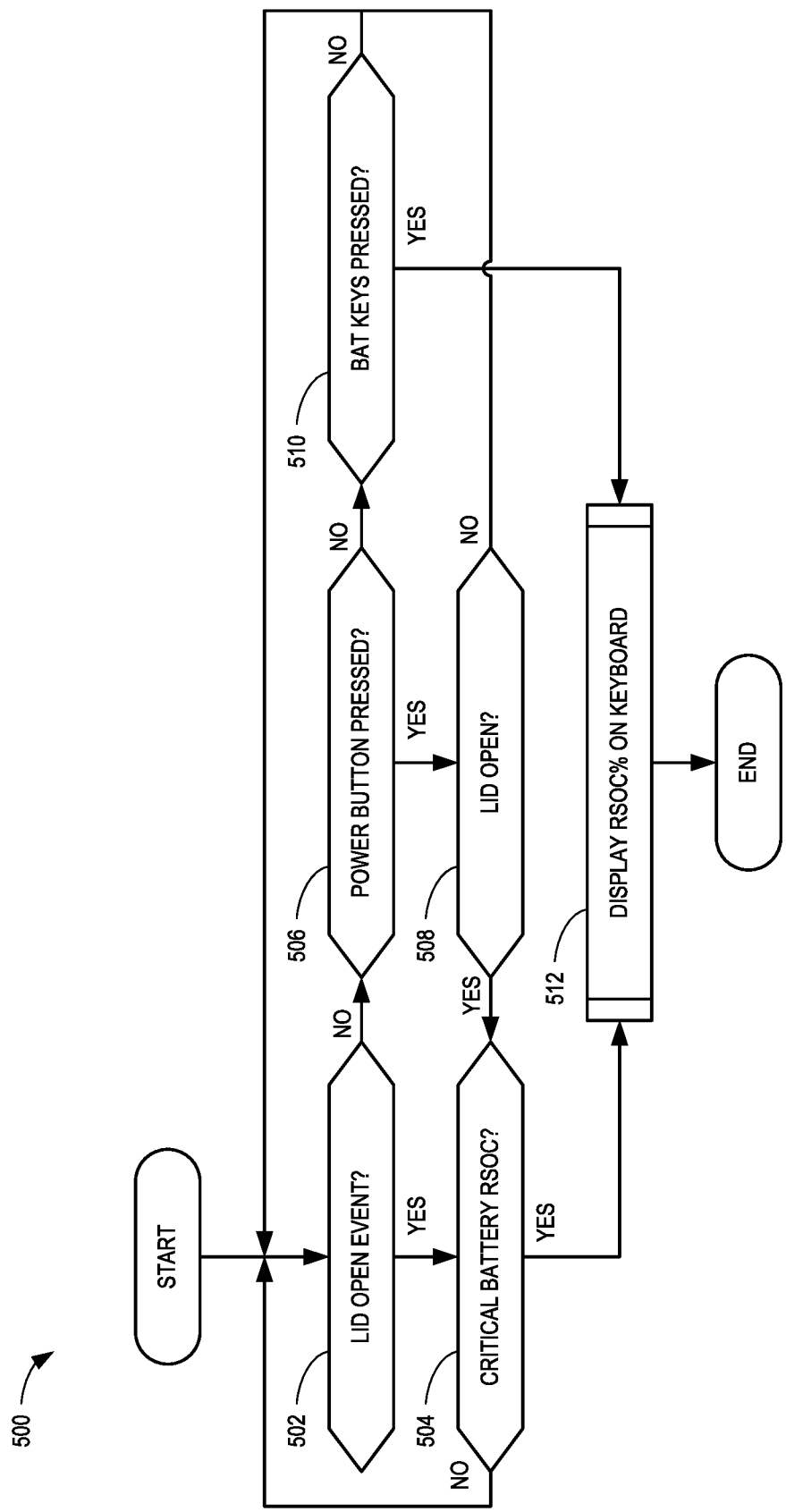
FIG. 5 is a flowchart representative of example machine readable instructions and/or example operations that may be executed and/or instantiated by processor circuitry to display a charge level of a battery on a keyboard of a mobile device.
Figure 6:
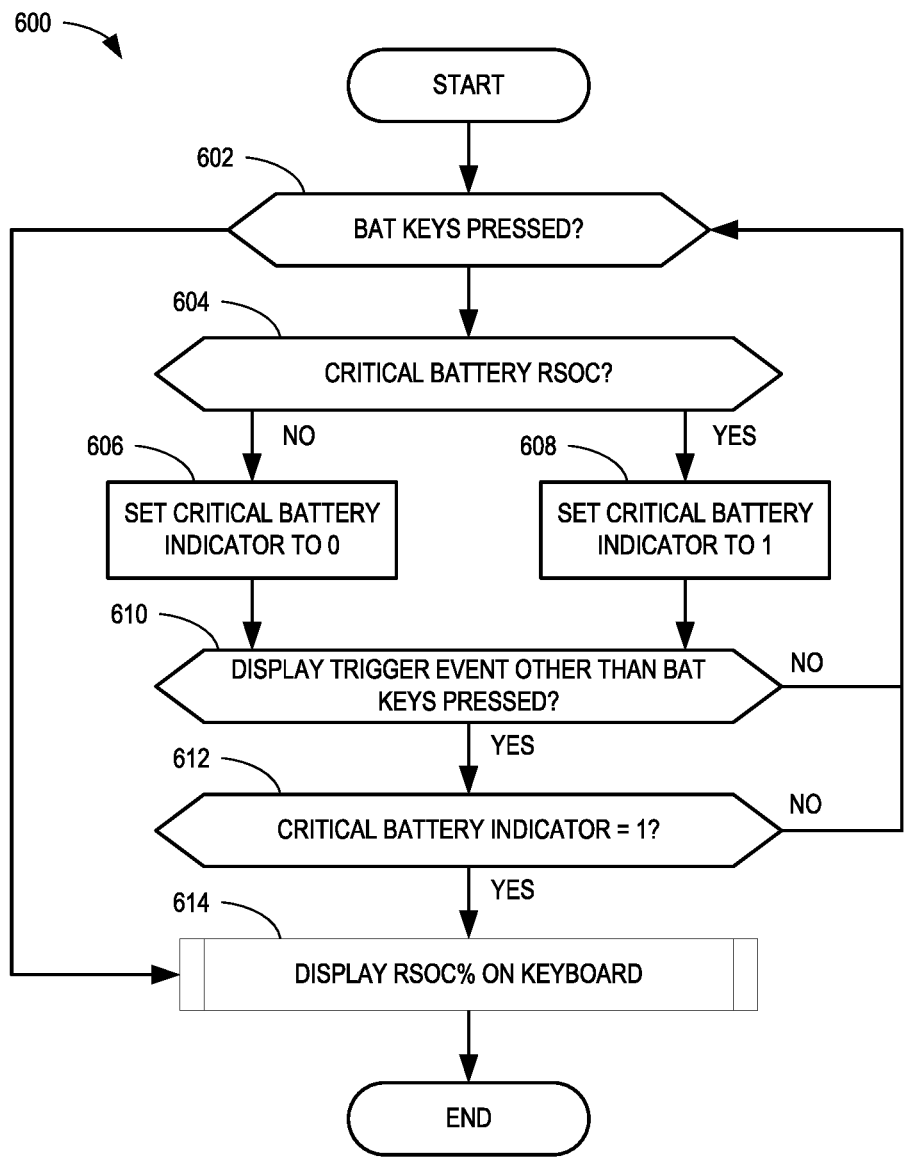
FIG. 6 is a flowchart representative of example machine readable instructions and/or example operations that may be executed and/or instantiated by processor circuitry to implement an automated display of a charge level of a battery on a keyboard of a mobile device.
Figure 7:
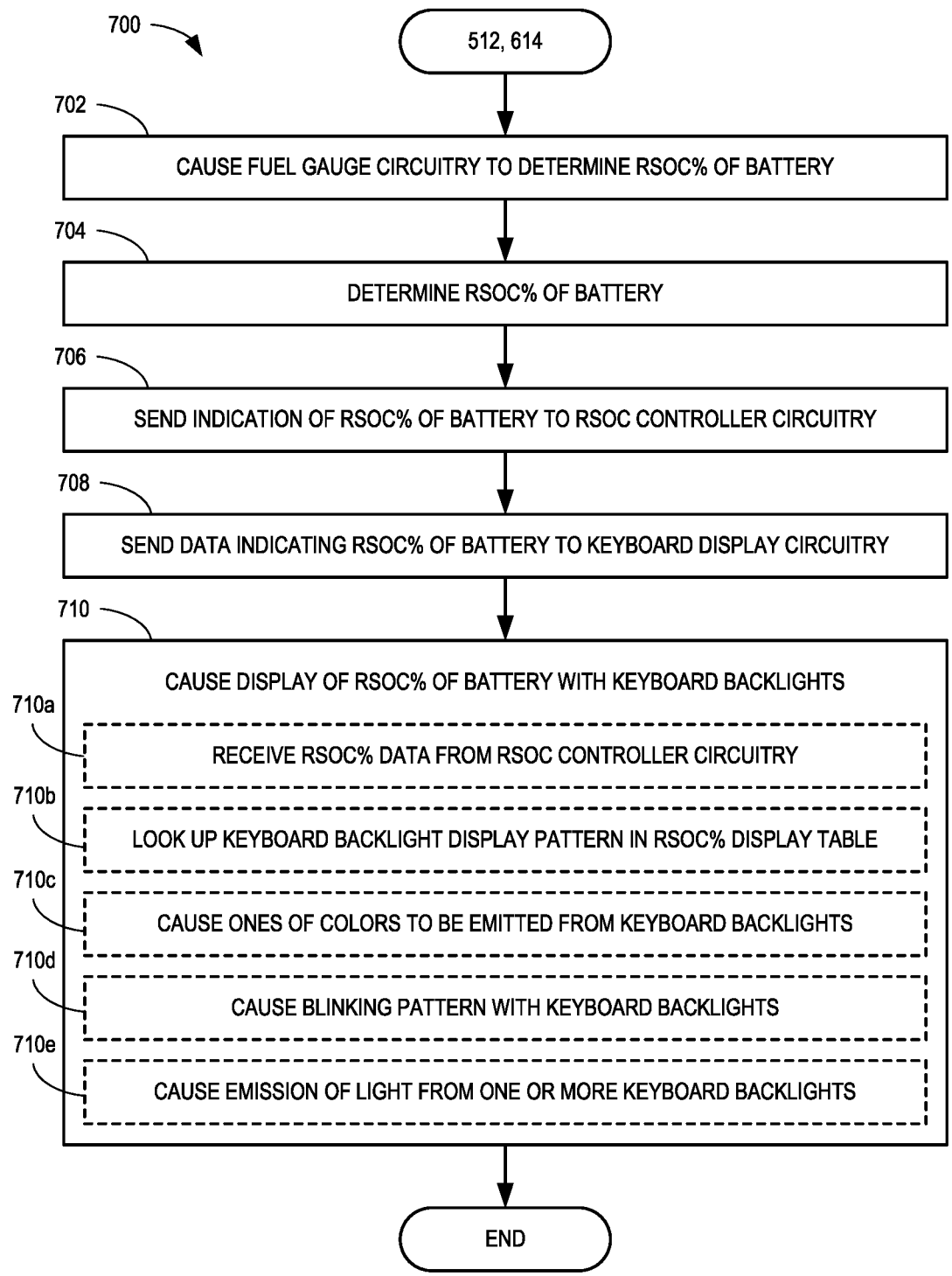
FIG. 7 is a flowchart representative of example machine readable instructions and/or example operations that may be executed and/or instantiated by processor circuitry to cause a keyboard of a mobile device to visually display a battery charge level with patterns of backlights from the keyboard.

In some examples, the fuel gauge circuitry 200 is instantiated by processor circuitry executing fuel gauge circuitry 200 instructions and/or configured to perform operations such as those represented by the flowcharts of FIGS. 5-7.

In some examples, the apparatus includes means determining a level of charge of a battery. For example, the means for determining may be implemented by the fuel gauge circuitry 200. In some examples, the fuel gauge circuitry 200 may be instantiated by processor circuitry such as the example processor circuitry 812 of FIG. 8. For instance, the fuel gauge circuitry 200 may be instantiated by the example microprocessor 900 of FIG. 9 executing machine executable instructions such as those implemented by at least block 504 of FIG. 5, blocks 604, 606, and 608 of FIG. 6, and blocks 704 and 706 of FIG. 7. In some examples, the fuel gauge circuitry 200 may be instantiated by hardware logic circuitry, which may be implemented by an ASIC, XPU, or the FPGA circuitry 1000 of FIG. 10 structured to perform operations corresponding to the machine readable instructions. Additionally or alternatively, the fuel gauge circuitry 200 may be instantiated by any other combination of hardware, software, and/or firmware. For example, the fuel gauge circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining is also to compare the charge level of the battery to a critical charge level threshold. In some examples, the means for determining is also to send an indication to the RSOC controller circuitry 202 when the charge level of the battery satisfies the critical charge level threshold.

Figure 3A:
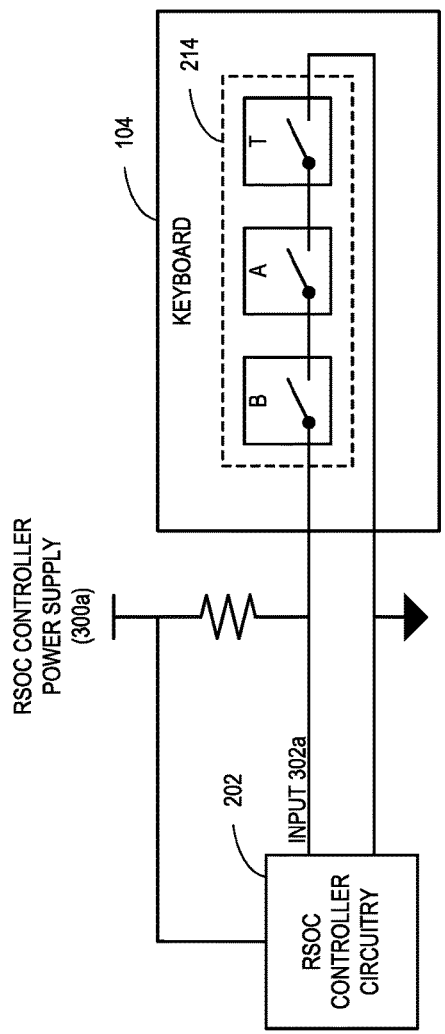
FIGS. 3A-3B illustrate two examples of patterns of keys being pressed on a keyboard to initiate displaying a battery charge level on the keyboard.
Figure 3B:
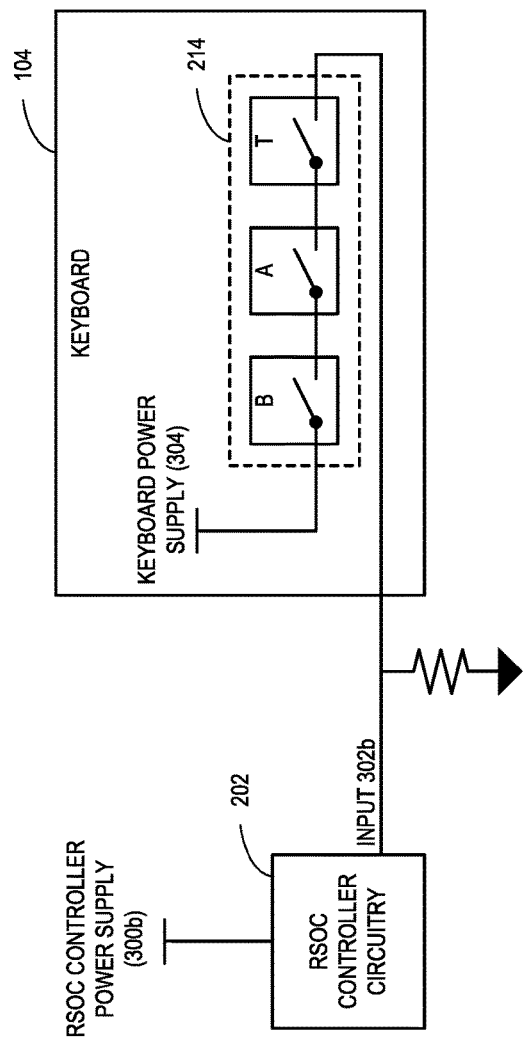

In the illustrated example of FIG. 2, the RSOC display management circuitry 108 includes the RSOC controller circuitry 202. The example RSOC controller circuitry 202 detects a battery charge level display event on a mobile device (e.g. laptop 102). For example, the battery charge level display event may be a signal received (e.g., obtained) that indicates a process to display (or determine whether to display) a battery charge level is to be initiated (e.g., initiating a process to display the RSOC % of the battery 106 in the laptop 102). For example, the battery charge level display event may include detecting a pattern of keys 216 pressed on the keyboard 104. In some examples, the keyboard 104 includes a second set of wire traces for each key that is associated with the pattern of keys 216. However, in some examples, the RSOC display management circuitry 108 obtains a signal from a keyboard controller when the keyboard controller detects the pattern of keys 216 pressed on the keyboard 104. FIGS. 3A and 3B illustrate two examples of keyboard configuration layouts to implement a source signal for detecting the pattern of keys 216. In some examples, the laptop 102 (e.g., the mobile system) is in a pre-boot state and has a limited ability to provide information to the display panel 118. In some examples, a power supply to source power to circuitry/logic within the RSOC controller circuitry 202 is present.

FIGS. 3A-3B illustrate two examples of patterns of keys being pressed on a keyboard 104 to initiate displaying a battery charge level on the keyboard 104. In the illustrated example in FIG. 3A, an RSOC controller power supply 300a powers the RSOC controller circuitry 202. In the illustrated example in FIG. 3B, an RSOC controller power supply 300b powers the RSOC controller circuitry 202.

In order for the keyboard 104 to provide a signal indicating the pattern of keys 216 has been pressed, the keyboard 104 requires a power supply to source a signal of a certain voltage level as input to the RSOC controller circuitry 202. In FIG. 3A, the example RSOC controller power supply 300a has a dual purpose. In addition to powering the RSOC controller circuitry 202, the example RSOC controller power supply 300a sends a voltage as input 302a to the RSOC controller circuitry 202 when the pattern of keys 216 has been pressed simultaneously. For example, if the pattern of keys 216 includes keys B+A+T, then when all three are pressed simultaneously (B+A+T), the wire trace for the input 302a becomes a closed circuit with a signal (e.g., at a nominal voltage such as 1 Volt, 5 Volts, or another nominal voltage) supplied from the RSOC controller power supply 300a to the RSOC controller circuitry 202 (e.g., as the input 302a).

In FIG. 3B, the example RSOC controller power supply 300b does not have the same dual purpose. Thus, another power supply, such as keyboard power supply 304, supplies the wire trace from the keys on the keyboard 104 to the RSOC controller circuitry 202. For example, if the pattern of keys 216 includes keys B+A+T, then when all three are pressed simultaneously (B+A+T), the wire trace for the input 302b becomes a closed circuit with a signal (e.g., at a nominal voltage such as 1 Volt, 5 Volts, or another nominal voltage) supplied from the RSOC controller power supply 300a to the RSOC controller circuitry 202 (e.g., as the input 302b).

In some examples, the RSOC controller circuitry 202 may acknowledge the pattern of keys 216 pressed on the keyboard 104 once all of the keys in the pattern are simultaneously pressed. In some examples, the RSOC controller circuitry 202 may acknowledge the pattern of keys 216 pressed on the keyboard 104 once all of the keys in the pattern are simultaneously pressed for a period of time. For example, the B+A+T keys are all pressed for a minimum of two seconds prior to the RSOC controller circuitry 202 acknowledging the pattern of keys 216.

Thus, returning to FIG. 2, in some examples, the RSOC controller circuitry 202 may additionally or alternatively receive a signal from the lid sensor circuitry 206. For example, the lid sensor circuitry 206 may be a sensor that emits/transmits/sends a signal when it detects the lid to the laptop is open. In some examples, the lid sensor circuitry 206 may be a sensor integrated with or near the hinge 116 in FIG. 1, or elsewhere in the laptop 102, that can detect the laptop 102 in the open position and/or in the closed position. The example lid sensor circuitry 206 may indicate whether the lid to the laptop 102 is open. In some examples, the lid in a standard clamshell-style laptop can be in a closed state/position or open state/position. For example, the lid sensor circuitry 206 may send a nominal voltage signal to the RSOC controller circuitry 202 when the lid is open. In some examples, the nominal voltage signal may be a continuous nominal voltage signal. However, in some examples, the nominal voltage signal may be a pulse or other temporary signal to provide an indication for other logic within the laptop 102 to set a system variable flag indicating the lid is open.

In the illustrated example of FIG. 2, the RSOC controller circuitry 202 may additionally or alternatively receive a signal from the power button 208 for the laptop 102. For example, when a user presses the power button, the power button may close a circuit of a wire trace that provides a power button press signal as input to the RSOC controller circuitry 202.

Thus, in some examples, the battery charge level display event may include one or more signals including the pattern of keys 216 press event signal from the keyboard 102, a lid open event signal from the lid sensor circuitry 206, a power button press event signal from the power button 208, and/or one or more other battery charge level display event signals.

In the illustrated example of FIG. 2, when (e.g., after) the RSOC controller circuitry 202 detects a battery charge level display event from one or more received signals, the RSOC controller circuitry 202 performs one or more actions detailed below. In some examples, the RSOC controller circuitry 202 causes the fuel gauge circuitry 200 to determine the current charge level (RSOC %) of the battery 106. For example, the RSOC controller circuitry 202 and the fuel gauge circuitry 200 may be communicatively coupled through an I2C interface or another interface capable of enabling communication between two or more circuitry blocks within the laptop 102. In some examples, the RSOC controller circuitry 202 sends a message (e.g., instruction, command, signal, etc.) to the fuel gauge circuitry 200 over the I2C or other communication interface, which causes the fuel gauge circuitry 200 to determine the current charge level of the battery 106 (as described above). After the fuel gauge circuitry 202 determines the current charge level of the battery 106, the fuel gauge circuitry 202 sends a message back to the RSOC controller circuitry 202 with the determined current charge level of the battery 106.

In some examples, the RSOC controller circuitry 202 sends data (e.g., a message/communication across an I2C channel or another interface) indicating the current charge level of the battery 106 on the keyboard 104. For example, after the RSOC controller circuitry 202 receives the current charge level of the battery 106 from the fuel gauge circuitry 202, the RSOC controller circuitry 202 may forward the current charge level of the battery 106 to the keyboard display circuitry 204. In some examples, the RSOC controller circuitry 202 causes the keyboard display circuitry 204 to initiate a display on the keyboard 104 of a current charge level of the battery 106.

In some examples, the RSOC controller circuitry 202 is instantiated by processor circuitry executing RSOC controller circuitry 202 instructions and/or configured to perform operations such as those represented by the flowcharts of FIGS. 5-7.

In some examples, the apparatus includes means for detecting a battery charge level display event. For example, the means for detecting may be implemented by the RSOC controller circuitry 202. In some examples, the RSOC controller circuitry 202 may be instantiated by processor circuitry such as the example processor circuitry 812 of FIG. 8. For instance, the RSOC controller circuitry 202 may be instantiated by the example microprocessor 900 of FIG. 9 executing machine executable instructions such as those implemented by at least blocks 502, 506, 508, and 510 of FIGS. 5, 602, 610, and 612 of FIG. 6, and 702 and 708 of FIG. 7. In some examples, the RSOC controller circuitry 202 may be instantiated by hardware logic circuitry, which may be implemented by an ASIC, XPU, or the FPGA circuitry 1000 of FIG. 10 structured to perform operations corresponding to the machine readable instructions. Additionally or alternatively, the RSOC controller circuitry 202 may be instantiated by any other combination of hardware, software, and/or firmware. For example, the RSOC controller circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for detecting is also to detect the pattern of keys 216 being pressed on a keyboard. In some examples, the means for detecting is also to detect a lid open event for a mobile device (e.g., laptop 102). In some examples, the means for detecting is also to detect a power button press for the mobile device. In some examples, the means for detecting is also to cause the fuel gauge circuitry 200 to determine a current charge level of the battery 106. In some examples, the means for detecting is also to obtain (e.g., receive) a current charge level of the battery 106 from the fuel gauge circuitry 200. In some examples, the means for detecting is also to send data that includes the current charge level of the battery 106 to the keyboard display circuitry 204. In some examples, the means for detecting is also to cause the keyboard display circuitry 204 to initiate the display of the current charge level of the battery 106 on the keyboard 104.

In the illustrated example of FIG. 2, the RSOC display management circuitry 108 includes the keyboard display circuitry 204. The example keyboard display circuitry 204 includes logic to cause the display of the charge level of the battery 106 with at least some of the keyboard backlights. For example, the keyboard display circuitry 204 may be coupled through wire traces to one or more backlights behind/under the surface of some of the keys on the keyboard 104, such as a group of battery charge display keys 110. The group of battery charge display keys 110 may include several keys on the keyboard 104, but not necessarily all keys on the keyboard 104. For example, one set of keys to utilize as the group of battery charge display keys 110 may be the number keys 1-9 and 0, which are in numerical order (except for the 0) on a QWERTY keyboard. In some examples, the keyboard display circuitry 204 may receive/obtain data (including the current charge level of the battery) from the RSOC controller circuitry 202 over an I2C or other interface/bus interpret the data into one or more commands to light specific backlights on the keyboard.

Figure 4:
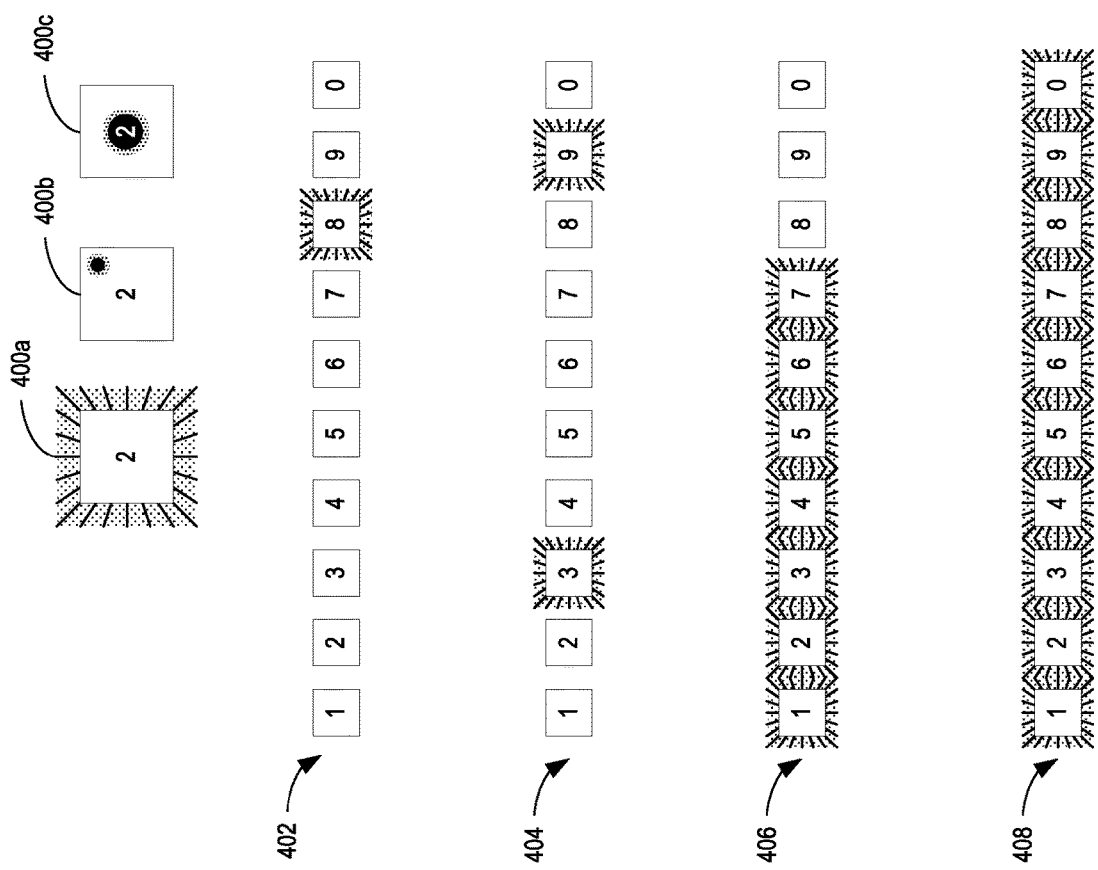
FIG. 4 illustrates several examples of keyboard backlights and keyboard backlight patterns to indicate a charge level of a battery 106.

FIG. 4 illustrates several examples of keyboard backlights and keyboard backlight patterns to indicate a charge level of the battery 106. For example, keyboard backlights may take one of several forms, such as the three types of backlights illustrated as backlight type 400a, backlight type 400b, and/or backlight type 400c. The example backlight type 400a includes a backlight that provides a washed ambient light around the sides/edges of the key. The example backlight type 400b includes a backlight that provides a point of light through a transparent or translucent portion of the key surface. The example backlight type 400c includes a backlight that provides a focused area of light through a transparent or translucent character symbol (e.g., the light emanates through the number "2") in the surface of the key. However, in some examples, there may be one or more other forms of keyboard backlights.

In some examples, the source light may be an LED light or another type of light source. In some examples, there may be more than one LED light source behind each key on the keyboard 104 (or there may be more than one LED light source behind a subset of keys on the keyboard). In some examples, the LED light sources may include the ability to emit more than one color of light. For example, a backlight LED light source may include the ability to emit red, yellow, blue, green, etc. colored light. In some examples, different keys may emit different colored light simultaneously. For example, the numbered keys may emit an orange light while the remaining keys on the keyboard 104 emit a white light. In some examples, the keyboard display circuitry 204 may cause the group of battery charge display keys 110 to emit at least one alternate color when the RSOC % of the battery 106 satisfies a critical charge threshold. As used herein, an "alternate color" means the color emitted by a backlight for a key is different from a standard color emitted by the backlights for the keys on the keyboard 104 (e.g., white may be the standard color). For example, if the RSOC % of the battery 106 is 8% and the critical charge threshold is at or below 15%, then the keyboard display circuitry 204 may cause the backlight(s) for at least one of the group of battery charge display keys 110 to emit a red light while the remaining keys on the keyboard emit a white light.

In some examples, the keyboard 104 may show only a single lit key to provide a coarse grained display of the RSOC % (e.g., the charge level of the battery). For example, in the illustrated example 402, if the RSOC % is 82%, the keyboard display circuitry 204 causes at least one backlight behind the "8" key to be illuminated. In other words, in some examples, the "9" key is illuminated if the RSOC % is between 90-99%, the "8" key is illuminated if the RSOC % is between 80-89%, the "7" key is illuminated if the RSOC % is between 70-79%, and so on.

In some examples, the keyboard 104 may show two lit keys to provide a single digit, fine-grained display of the RSOC %. For example, in the illustrated example 404, if the RSOC % is 39%, the keyboard display circuitry 204 causes backlights behind the "3" key and the "9" key to be illuminated. In some examples, in order to remove the confusion of whether the keyboard is displaying a 39% charge level of the battery or a 93% charge level of the battery, the keyboard display circuitry 204 may cause the backlight of the "3" key to illuminate at a brighter level than the backlight of the "9" key. However, in some examples, the keyboard display circuitry 204 may cause the backlight of the "3" key to constantly illuminate while the backlight of the "9" key may blink. In some examples, such different illumination values or patterns between the two backlights may provide a clear articulation of the 39% charge instead of the 93% charge. In some examples, the keyboard display circuitry 204 may cause both numbers to blink in an order. For example, for a 39% RSOC % value, the "3" key may turn on for 1 second and then turn off, and then the "9" key may turn on for 1 second and then turn off. This example pattern may repeat with an interval between each set of "3" then "9" where all keys are not illuminated to distinguish between the first key in the sequence and the second key in the sequence.

In some examples, the keyboard 104 may show a bar of lit keys to provide a display of the RSOC %. For example, in the illustrated example 406, if the RSOC % is 69%, the keyboard display circuitry 204 may cause the backlight of the "1" through "6" keys on the keyboard 104 to be fully illuminated while the "7" key may be lit but at a slightly lesser luminance value. In some examples, as the RSOC % drops from 70% to 60%, the backlight of the "7" key may be lit at different luminance levels. For example, at 69% RSOC %, the backlight of the "7" key may be lit at almost the same bright luminance level as the backlight of the "1" through "6" keys. Once the RSOC % is down to 61%, the keyboard display circuitry 204 may cause the backlight of the "7" key to be at a dimmest luminance value. The example keyboard display circuitry 204 may cause this format of display to continue through each ten percent increment until the illuminated number bar is down to single digits, where the illuminated value may switch back to the illustrated example of 402 above.

In some examples, the keyboard may show a full bar of lit keys with a green color indicating the battery 106 is fully charged. For example, in the illustrated example 408, if the RSOC % is 100%, the keyboard display circuitry 204 may cause the backlights of the "1" through "9" keys and the "0" key to all be illuminated in a green backlight, providing a visual color aid to help a user understand the current RSOC % state of charge of the battery 106. In some examples, the color may change depending on the RSOC %. For example, returning to the current charge level of the battery display example shown at 406, the keyboard display circuitry 204 may cause the bar charge indicator to display using green at an RSOC % of between 50% and 100%, display yellow at an RSOC % of between 15% and 49%, and display red at an RSOC % of between 0% and 14%. In some examples, any other combination of colors and/or percentage levels may be utilized as battery charge level (RSOC %) indicators.

In some examples, any one or more display processes other than the examples described above, using the backlights of one or more of the keys of the keyboard 104, may be utilized to display the RSOC % of the battery 106.

Returning to FIG. 2, in some examples, the keyboard display circuitry 204 receives a command/message sent from the RSOC controller circuitry 202. In some examples, the command includes data sent from the RSOC controller circuitry 202 that has the current RSOC % value. In some examples, the keyboard display circuitry 204 has an RSOC % display table 218 to look up a pattern of illuminated backlights that correspond to a specific RSOC % of the battery 106. In some examples, the RSOC % display table 218 is located in a local buffer or register in the RSOC display management circuitry 108. However, in some examples, the RSOC % display table 218 is located in memory 212 or a system register, cache, or buffer that is in the laptop 102, but external to the RSOC display management circuitry 108.

In some examples, the RSOC % display table 218 is a table where each row corresponds to a specific RSOC % value (e.g., row 1 corresponds to a 1% RSOC % value of the batter 106, row 2 corresponds to a 2% RSOC % value of the batter 106, and so on). In some examples, for each row in the RSOC % display table 218 that corresponds to a specific RSOC % value, there may be one or more instructions that cause the keyboard display circuitry 204 to turn on and/or off one or more keyboard backlights within the group of battery charge display keys 110. In some examples, the one or more instructions may also cause the keyboard display circuitry 204 to change a color being emitted by one or more keyboard backlights within the group of battery charge display keys 110, cause a blinking pattern with one or more keyboard backlights within the group of battery charge display keys 110, among other visual indicators.

In some examples, the RSOC % display table 218 is configurable by a user and/or an administrator within an operating system setting or within a BIOS setting to allow for custom visualizations of the charge level of the battery.

In some examples, the keyboard display circuitry 204 is instantiated by processor circuitry executing keyboard display circuitry 204 instructions and/or configured to perform operations such as those represented by the flowchart of FIG. 7.

In some examples, the apparatus includes means for causing a display of the charge level of a battery with ones of keyboard backlights. For example, the means for causing may be implemented by keyboard display circuitry 204. In some examples, the keyboard display circuitry 204 may be instantiated by processor circuitry such as the example processor circuitry 812 of FIG. 8. For instance, the keyboard display circuitry 204 may be instantiated by the example microprocessor 900 of FIG. 9 executing machine executable instructions such as those implemented by at least blocks 710, 710a, 710b, 710c, and 710d of FIG. 7. In some examples, the keyboard display circuitry 204 may be instantiated by hardware logic circuitry, which may be implemented by an ASIC, XPU, or the FPGA circuitry 1000 of FIG. 10 structured to perform operations corresponding to the machine readable instructions. Additionally or alternatively, the keyboard display circuitry 204 may be instantiated by any other combination of hardware, software, and/or firmware. For example, the keyboard display circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for causing is also to cause a backlight of a key on the keyboard 104 to emit at least one alternate color (e.g., a color other than a standard backlight color such as white). In some examples, the means for causing is also to cause ones of colors (e.g., red, green, blue, yellow, etc.) to be emitted from a backlight of a key on the keyboard 104. In some examples, the means for causing is also to obtain RSOC % data from the RSOC controller circuitry 202. In some examples, the means for causing is also to cause a blinking pattern from a backlight of a key on the keyboard 104. In some examples, the means for causing is also to look up a keyboard backlight display pattern in an RSOC % display table 218.

In some examples, operations of the fuel gauge circuitry 200, the RSOC controller circuitry 202, and the keyboard display circuitry 204, and/or more generally the RSOC display management circuitry 108 may be operational during a pre-boot state of the laptop 102 (e.g., the mobile device). For example, detecting a lid opening event, detecting a power button press, detecting a pattern of keys 216 pressed, determining an RSOC % of the battery 106, and displaying the RSOC % on the group of battery charge display keys 110 may each occur when the laptop 102 is in a pre-boot state. As used herein, the pre-boot state means the laptop 102 or another mobile device is in a power state such as hibernate or a sleep state (e.g., PG3, deep SX, S5, S4, S3, S0, or another low power state) that is not a state where an operating system is actively running on the processor circuitry 210. Thus, the pre-boot state may include any power state that does not have the ability to run an operating system routine to provide the user the current charge level of the battery (e.g., the RSOC %).

While an example manner of implementing the RSOC display management circuitry 108 of FIG. 2 is illustrated in FIG. 2, one or more of the elements, processes, and/or devices illustrated in FIG. 2 may be combined, divided, re-arranged, omitted, eliminated, and/or implemented in any other way. Further, the example fuel gauge circuitry 200, the example RSOC controller circuitry 202, the example keyboard display circuitry 204, and/or, more generally, the example RSOC display management circuitry 108 of FIG. 2, may be implemented by hardware alone or by hardware in combination with software and/or firmware. Thus, for example, any of the example fuel gauge circuitry 200, the example RSOC controller circuitry 202, the example keyboard display circuitry 204, and/or, more generally, the example RSOC display management circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example RSOC display management circuitry 108 of FIG. 2 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the RSOC display management circuitry 108 of FIG. 2 is shown in FIG. 5. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example RSOC display management circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to display a charge level of a battery on a keyboard of the mobile device. The machine readable instructions and/or the operations 500 of FIG. 5 begin at block 502, at which the example RSOC controller circuitry 202 detects whether there has been a lid open event for the mobile device (e.g., laptop 102). As used herein, a lid open event means the lid of the laptop (e.g., lid 114 in FIG. 1) has changed from a closed position to an open position (the open and closed positions were described in connection with FIG. 1 above). For example, the RSOC controller circuitry 202 may receive an indication (e.g., a signal, message, etc.) of a lid open event from the lid sensor circuitry 206 and receiving the indication may be considered detecting the lid open event.

If a lid open event has been detected, then the example process continues at block 504. If a lid open event has not been detected, then the example process continues at block 506.

At block 504, the example fuel gauge circuitry 200 determines whether the charge level of the battery satisfies a critical battery RSOC %. For example, the fuel gauge circuitry 200 may determine a current charge level of the battery 106 (e.g., the RSOC % of the battery 106) and compare the result to a critical charge level threshold. In some examples, the comparison indicates whether the currently charge level of the battery 106 satisfies the critical charge level threshold (e.g., the currently charge level of the battery 106 is at or below the critical charge level threshold).

If the currently charge level of the battery 106 satisfies the critical charge level threshold, then the example process continues at block 512. If the current charge level of the battery 106 does not satisfy the critical charge level threshold (e.g., the currently charge level of the battery 106 is above the critical charge level threshold), then the example process returns to block 502.

At block 506, the example RSOC controller circuitry 202 determines if a power button of the mobile device has been pressed. If the power button has been pressed, then the example process continues at block 508. However, if a power button of the mobile device has not been pressed, then the example process continues at block 510.

At block 508, the example RSOC controller circuitry 202 determines if the lid is open. For example, if the power button has been determined to have been pressed (at block 506) but the lid 114 for the mobile device (e.g., laptop 102) is closed, then displaying the current charge of the battery (e.g., the RSOC %) on the group of battery charge display keys 110 on the keyboard 104 may not be beneficial because a user would not be able to see the keyboard 104. Thus, if the lid is open, the example process continues at block 504. Otherwise, if the lid is closed (e.g., not open), then the example process returns to block 502.

At block 510, the example RSOC controller circuitry 202 determines if a pattern of keys 216 (FIG. 2) have been pressed. As described above in connection with FIG. 2, the pattern of keys 216 may be the B+A+T keys pressed simultaneously. Thus, as used herein, the pattern of keys 216 may alternatively be described as "BAT keys" (e.g., B+A+T keys, representing a request to display the current charge of the battery). In some examples, the keys may be different than the B+A+T keys. For example, although referred to as the BAT keys, any key combination may be used, such as the "1"+"2"+"3" keys, which may be ergonomically preferable to the "B"+"A"+"T" keys. Additionally, the example RSOC controller circuitry 202 may determine whether the BAT keys have been pressed simultaneously for at least a certain amount of time. For example, the BAT keys may need to be simultaneously pressed for at least two seconds before the RSOC controller circuitry 202 determines that the BAT keys have been pressed.

If the BAT keys have been pressed (e.g., the RSOC controller circuitry 202 determines the BAT keys were pressed, possibly for at least a certain amount of time), then the example process continues at block 512. However, if the BAT keys have not been pressed, then the process returns to block 502.

At block 512, the example RSOC display management circuitry 108 (including the fuel gauge circuitry 200, the RSOC controller circuitry 202, and the keyboard display circuitry 204) performs a process to display the RSOC % on the keyboard 104. The process to display the RSOC % on the keyboard 104 is described in detail below in connection to FIG. 7. Once the process at block 512 has completed, the machine readable instructions and/or the operations 500 of FIG. 5 end.

FIG. 6 is a flowchart representative of example machine readable instructions and/or example operations 600 that may be executed and/or instantiated by processor circuitry to implement an automated display of a charge level of a battery on a keyboard of the mobile device. The machine readable instructions and/or the operations 600 of FIG. 6 begin at block 602, at which the example RSOC controller circuitry 202 determines if the BAT keys have been pressed. If the BAT keys have been pressed (e.g., the RSOC controller circuitry 202 determines the BAT keys were pressed, possibly for at least a certain amount of time), then the example process continues at block 614. However, if the BAT keys have not been pressed, then the process continues at block 604.

At block 604, the example fuel gauge circuitry 200 determines whether the charge level of the battery satisfies a critical battery RSOC %. For example, the fuel gauge circuitry 200 may determine a current charge level of the battery 106 (e.g., the RSOC % of the battery 106) and compare the result to a critical charge level threshold. In some examples, the comparison indicates whether the currently charge level of the battery 106 satisfies the critical charge level threshold (e.g., the currently charge level of the battery 106 is at or below the critical charge level threshold).

If the current charge level of the battery 106 does not satisfy the critical charge level threshold, then, at block 606, the fuel gauge circuitry 200 sets a critical battery indicator to 0 (e.g., a CRITICAL_BATTERY_INDICATOR system variable/flag or another system variable flag may be set to 0). In some examples, the critical battery indicator system variable may be stored in a register, a buffer, a memory, a cache, or in any other location that can store a bit value. If the current charge level of the battery 106 does satisfy the critical charge level threshold, then, at block 608, the fuel gauge circuitry 200 sets a critical battery indicator to 1 (e.g., a CRITICAL_BATTERY_INDICATOR system variable/flag or another system variable flag may be set to 1). After either block 606 or 608 is completed, the process continues at block 610.

At block 610, the RSOC controller circuitry 202 determines whether there is an occurrence of a display trigger event takes place other than the BAT keys being pressed. As used herein, a display trigger event means an event detected by the RSOC controller circuitry 202 that would cause the RSOC controller circuitry 202 to initiate a process to determine whether to display the RSOC % of the battery 106. For example, a display trigger event other than the BAT keys being pressed may include the laptop 102 power button being pressed or a lid open event being detected, among other possible display trigger events. In some examples, if the BAT keys are pressed, the RSOC controller circuitry 202 overrides any further automated determination as to whether to display the RSOC % of the battery 106 on the keyboard 104 because the BAT key press event signifies a user's intent to see the RSOC % of the battery 106. As used herein, an "automated" display of the RSOC % of the battery 106 means the display happens without a manual BAT keys input from a user of the laptop 102 requesting the display of the RSOC % of the battery 106). Thus, an example automated display of the RSOC % of the battery 106 may be initiated by an event other than a user input requesting the display of the RSOC % of the battery 106.

If an occurrence of a display trigger event other than the BAT keys being pressed takes place, then the process continues at block 612. Otherwise, if an occurrence of a display trigger event other than the BAT keys being pressed does not take place, then the process returns to block 602.

At block 612, the example RSOC controller circuitry 202 determines whether the critical battery indicator is set at 1. In some examples, the RSOC controller circuitry 202 reads the CRITICAL_BATTERY_INDICATOR system variable and determines whether its value is 1. If the critical battery indicator is set at 1, then the process continues at block 612. Otherwise, is critical battery indicator is not set at 1, then the process returns to block 602.

At block 614, the example RSOC display management circuitry 108 (including the fuel gauge circuitry 200, the RSOC controller circuitry 202, and the keyboard display circuitry 204) performs a process to display the RSOC % on the keyboard 104. The process to display the RSOC % on the keyboard 104 is described in detail below in connection to FIG. 7. Once the process at block 614 has completed, the machine readable instructions and/or the operations 600 of FIG. 6 end.

FIG. 7 is a flowchart representative of example machine readable instructions and/or example operations 700 that may be executed and/or instantiated by processor circuitry to display of a charge level of a battery on a keyboard of the mobile device. In some examples, the machine readable instructions and/or the operations 700 of FIG. 7 can be executed and/or instantiated by processor circuitry to implement block 512 of the machine readable instructions and/or the operations 500 of FIG. 5 and/or to implement block 614 of the machine readable instructions and/or the operations 600 of FIG. 6.

The machine readable instructions and/or the operations 700 of FIG. 7 begin at block 702, at which the example RSOC controller circuitry 202 causes the fuel gauge circuitry 202 to determine the RSOC % of the battery 106. For example, the RSOC controller circuitry 202 may send a message/communication/instruction to the fuel gauge circuitry 200 to measure the RSOC % of the battery 106 and send the resulting data back to the RSOC controller circuitry 202.

At block 704, upon receiving the message from the RSOC controller circuitry 202, the fuel gauge circuitry 200 determines the RSOC % of the battery 106. An example process describing how the fuel gauge circuitry 200 determines the RSOC % of the battery 106 is described above in connection with FIG. 2.

At block 706, the fuel gauge circuitry 200 sends an indication of the RSOC % of the battery 106 to the RSOC controller circuitry 202. For example, the fuel gauge circuitry 200 may send a message to the RSOC controller circuitry 202 that includes the RSOC % of the battery 106 as data in the message.

At block 708, after receiving the indication of the RSOC % of the battery 106, the RSOC controller circuitry 202 may send data indicating the RSOC % of the battery 106 to the keyboard display circuitry 204.

At block 710, the keyboard display circuitry 204 causes a display of the RSOC % of the battery 106 with one or more keyboard backlights. In some examples, the keyboard display circuitry 204 may perform one or more additional operations to implement the display of the RSOC % of the battery 106 with the one or more keyboard backlights. For example, at block 710a, the keyboard display circuitry 204 may receive/obtain RSOC % data corresponding to the battery 106 from the RSOC controller circuitry 202. For example, at block 710b, the keyboard display circuitry 204 may look up a keyboard backlight display pattern in the RSOC % display table 218. For example, at block 710c, the keyboard display circuitry 204 may cause ones of colors to be emitted from one or more of the keyboard backlights in the group of battery charge display keys 110. For example, at block 710d, the keyboard display circuitry 204 may cause a blinking pattern with one or more of the keyboard backlights in the group of battery charge display keys 110. For example, at block 710e, the keyboard display circuitry 204 may cause the emission of light from one or more of the keyboard backlights in the group of battery charge display keys 110. After block 710 has completed, the machine readable instructions and/or the operations 700 of FIG. 7 end.

FIG. 8 is a block diagram of an example processor platform 800 structured to execute and/or instantiate the machine readable instructions and/or the operations of FIGS. 5-7 to implement the RSOC display management circuitry of FIGS. 1 and 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the fuel gauge circuitry 200, the RSOC controller circuitry 202, and the keyboard display circuitry 204 within the RSOC display management circuitry 108.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIGS. 5-7, may be stored in the mass storage device 828, in the volatile memory 814, in the non-volatile memory 816, and/or on a removable non-transitory computer readable storage medium such as a CD or DVD.

Figure 9:
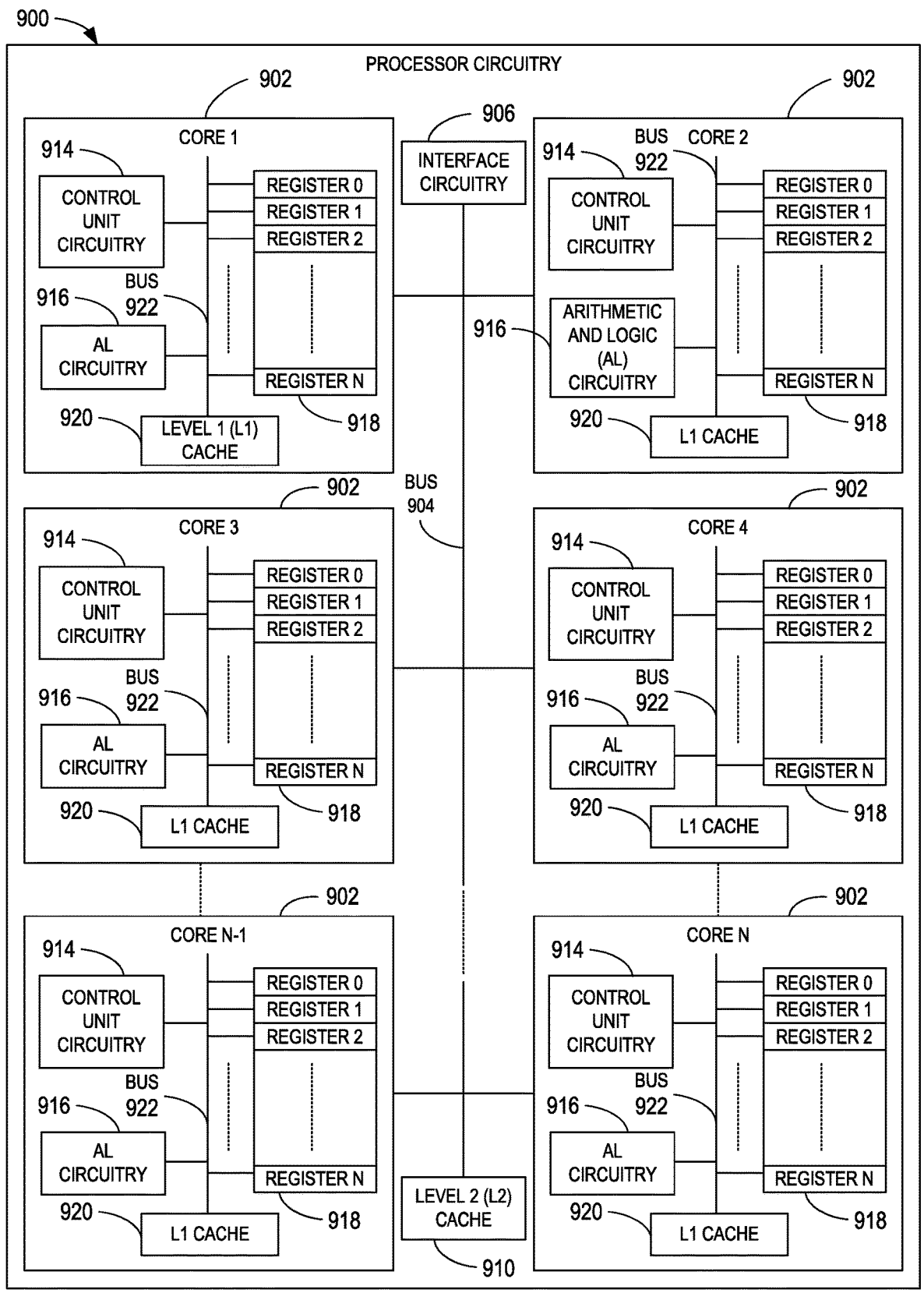
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowcharts of FIGS. 5-7 to effectively instantiate the circuitry of FIG. 2 as logic circuits to perform the operations corresponding to those machine readable instructions. In some such examples, the circuitry of FIG. 2 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 5-7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

Figure 10:
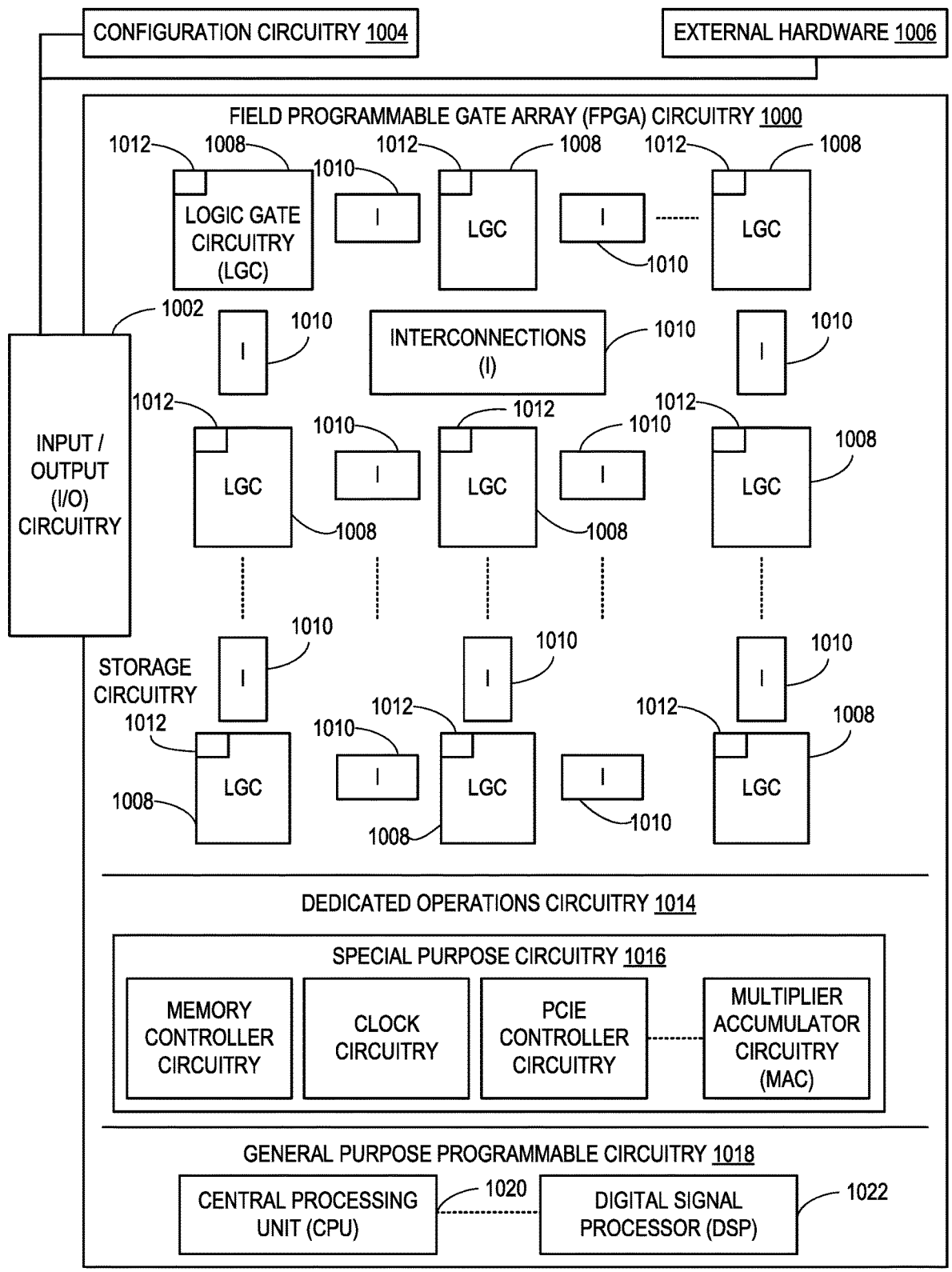
FIG. 10 is a block diagram of another example implementation of the processor circuitry of FIG. 8.

More specifically, in contrast to the microprocessor 900 of FIG. 9 described above (which is a general purpose device that may be programmed to execute some or all of the machine readable instructions represented by the flowcharts of FIGS. 5-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 5-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 5-7. As such, the FPGA circuitry 1000 may be structured to effectively instantiate some or all of the machine readable instructions of the flowcharts of FIGS. 5-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 5-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 5-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 6 illustrate two example implementations of the processor circuitry 812 of FIG. 8, many other approaches are contemplated. For example, as mentioned above, modern FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 5-7 may be executed by one or more of the cores 902 of FIG. 9, a second portion of the machine readable instructions represented by the flowcharts of FIGS. 5-7 may be executed by the FPGA circuitry 1000 of FIG. 10, and/or a third portion of the machine readable instructions represented by the flowcharts of FIGS. 5-7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
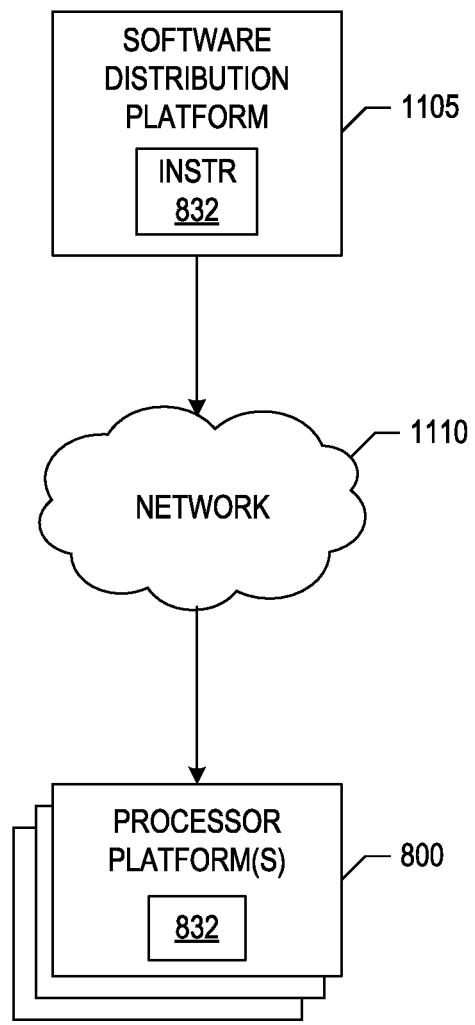
FIG. 11 is a block diagram of an example software distribution platform (e.g., one or more servers) to distribute software (e.g., software corresponding to the example machine readable instructions of FIGS. 5-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 500, 700, etc. of FIGS. 5-7, as described above. The one or more servers of the example software distribution platform 1105 are in communication with an example network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 500, 700, etc. of FIGS. 5-7, may be downloaded to the example processor platform 800, which is to execute the machine readable instructions 832 to implement the RSOC display management circuitry 108 of FIG. 2. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that implement off-screen indication of battery charge in mobile platforms. Disclosed systems, methods, apparatus, and articles of manufacture improve the efficiency of using a computing device by enabling a user of a mobile platform/device to be able to see a remaining state of charge percentage of a rechargeable battery powering the mobile platform/device without booting to the OS. Rather, a user of the mobile platform/device may see a visual indication of the battery charge level in low power states such as hibernate, among others. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising a keyboard, interface circuitry to communicatively couple the keyboard to processor circuitry, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate remaining state of charge (RSOC) controller circuitry to detect a battery charge level display event on a mobile device, the mobile device in a pre-boot state, fuel gauge circuitry to determine a charge level of a battery of the mobile device, and, after the battery charge level display event, keyboard display circuitry to cause a display of the charge level of the battery in the pre-boot state with ones of backlights of ones of keys on the keyboard.

Example 2 includes the apparatus of example 1, wherein to detect a battery charge level display event includes to detect a pattern of a first ones of keys on a keyboard of the mobile device have been pressed.

Example 3 includes the apparatus of example 1, wherein the keyboard display circuitry is to cause a blinking pattern with at least one of the ones of backlights.

Example 4 includes the apparatus of example 1, wherein the ones of keys on the keyboard include at least one number key indicating a percentage of the charge level.

Example 5 includes the apparatus of example 1, wherein the keyboard display circuitry is to cause ones of colors to be emitted from the ones of backlights, the ones of colors indicating the charge level of the battery.

Example 6 includes the apparatus of example 1, further including the fuel gauge circuitry is to compare the charge level of the battery to a critical charge level threshold, and send an indication to the RSOC controller circuitry when the charge level of the battery satisfies the critical charge level threshold, the RSOC controller circuitry is to send data indicating the charge level of the battery to the keyboard display circuitry after the critical charge level threshold is satisfied, and the keyboard display circuitry is to cause the display of the charge level of the battery with the ones of backlights emitting at least one alternate color after the critical charge level threshold is satisfied.

Example 7 includes the apparatus of example 6, wherein the RSOC controller circuitry is to detect whether a lid of the mobile device has opened, and cause the fuel gauge circuitry to compare the charge level of the battery to the critical charge level threshold after the lid of the mobile device has opened.

Example 8 includes the apparatus of example 1, wherein the keyboard display circuitry is to activate the ones of backlights by closing a circuit between a power source and the ones of backlights.

Example 9 includes a non-transitory machine readable storage medium comprising instructions that, when executed, cause processor circuitry to at least detect a battery charge level display event on a mobile device, the mobile device in a pre-boot state, determine a charge level of a battery of the mobile device, and, after the battery charge level display event, cause a display of the charge level of the battery in the pre-boot state with ones of backlights of ones of keys on a keyboard.

Example 10 includes the non-transitory machine readable storage medium of example 9, wherein the ones of keys are a first ones of keys, and wherein to detect a battery charge level display event includes to detect a pattern of a second ones of keys on a keyboard of the mobile device have been pressed.

Example 11 includes the non-transitory machine readable storage medium of example 9, wherein the instructions cause the processor to at least cause a blinking pattern with at least one of the ones of backlights.

Example 12 includes the non-transitory machine readable storage medium of example 9, wherein the ones of keys on the keyboard include at least one number key indicating a percentage of the charge level.

Example 13 includes the non-transitory machine readable storage medium of example 9, wherein the instructions cause the processor to at least cause ones of colors to be emitted from the ones of backlights, the ones of colors indicating the charge level of the battery.

Example 14 includes the non-transitory machine readable storage medium of example 9, wherein the instructions cause the processor to at least compare the charge level of the battery to a critical charge level threshold, and cause the display of the charge level of the battery with the ones of backlights emitting at least one alternate color after the critical charge level threshold is satisfied.

Example 15 includes the non-transitory machine readable storage medium of example 14, wherein the instructions cause the processor to at least detect whether a lid of the mobile device has opened, and compare the charge level of the battery to the critical charge level threshold after the lid of the mobile device has opened.

Example 16 includes the non-transitory machine readable storage medium of example 9, wherein the instructions cause the processor to at least activate the ones of backlights by closing a circuit between a power source and the ones of backlights.

Example 17 includes a method, comprising detecting a battery charge level display event on a mobile device, the mobile device in a pre-boot state, determining a charge level of a battery of the mobile device, and, after the battery charge level display event, causing a display of the charge level of the battery in the pre-boot state with ones of backlights of ones of keys on a keyboard.

Example 18 includes the method of example 17, wherein the ones of keys are a first ones of keys, and wherein detecting a battery charge level display event includes detecting a pattern of a second ones of keys on a keyboard of the mobile device have been pressed.

Example 19 includes the method of example 17, including causing a blinking pattern with at least one of the ones of backlights.

Example 20 includes the method of example 17, wherein the ones of keys on the keyboard include at least one number key indicating a percentage of the charge level.

Example 21 includes the method of example 17, including causing ones of colors to be emitted from the ones of backlights, the ones of colors indicating the charge level of the battery.

Example 22 includes the method of example 17, including comparing the charge level of the battery to a critical charge level threshold, and causing the display of the charge level of the battery with the ones of backlights emitting at least one alternate color after the critical charge level threshold is satisfied.

Example 23 includes the method of example 22, including detecting whether a lid of the mobile device has opened, and comparing the charge level of the battery to the critical charge level threshold after the lid of the mobile device has opened.

Example 24 includes the method of example 17, including activating the ones of backlights by closing a circuit between a power source and the ones of backlights.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
a keyboard;
interface circuitry to communicatively couple the keyboard to processor circuitry; and
the processor circuitry including one or more of:
at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the first operations, the second operations, or the third operations to instantiate:

remaining state of charge (RSOC) controller circuitry to detect a battery charge level display event on a mobile device, the mobile device in a pre-boot state;

fuel gauge circuitry to determine a charge level of a battery of the mobile device; and after the battery charge level display event, keyboard display circuitry to cause a display of the charge level of the battery in the pre-boot state with ones of backlights of ones of keys on the keyboard.

2. The apparatus of claim 1, wherein to detect a battery charge level display event includes to detect a pattern of a first ones of keys on a keyboard of the mobile device have been pressed.

3. The apparatus of claim 1, wherein the keyboard display circuitry is to cause a blinking pattern with at least one of the ones of backlights.

4. The apparatus of claim 1, wherein the ones of keys on the keyboard include at least one number key indicating a percentage of the charge level.

5. The apparatus of claim 1, wherein the keyboard display circuitry is to cause ones of colors to be emitted from the ones of backlights, the ones of colors indicating the charge level of the battery.

6. The apparatus of claim 1, further including:

the fuel gauge circuitry is to:
compare the charge level of the battery to a critical charge level threshold; and
send an indication to the RSOC controller circuitry when the charge level of the battery satisfies the critical charge level threshold;

the RSOC controller circuitry is to send data indicating the charge level of the battery to the keyboard display circuitry after the critical charge level threshold is satisfied; and the keyboard display circuitry is to cause the display of the charge level of the battery with the ones of backlights emitting at least one alternate color after the critical charge level threshold is satisfied.

7. The apparatus of claim 6, wherein the RSOC controller circuitry is to:
detect whether a lid of the mobile device has opened; and
cause the fuel gauge circuitry to compare the charge level of the battery to the critical charge level threshold after the lid of the mobile device has opened.

8. The apparatus of claim 1, wherein the keyboard display circuitry is to activate the ones of backlights by closing a circuit between a power source and the ones of backlights.

9. A non-transitory machine readable storage medium comprising instructions that, when executed, cause processor circuitry to at least:

detect a battery charge level display event on a mobile device, the mobile device in a pre-boot state;
determine a charge level of a battery of the mobile device; and
after the battery charge level display event, cause a display of the charge level of the battery in the pre-boot state with ones of backlights of ones of keys on a keyboard.

10. The non-transitory machine readable storage medium of claim 9, wherein the ones of keys are a first ones of keys, and wherein to detect a battery charge level display event includes to detect a pattern of a second ones of keys on a keyboard of the mobile device have been pressed.

11. The non-transitory machine readable storage medium of claim 9, wherein the instructions cause the processor circuitry to at least cause a blinking pattern with at least one of the ones of backlights.

12. The non-transitory machine readable storage medium of claim 9, wherein the ones of keys on the keyboard include at least one number key indicating a percentage of the charge level.

13. The non-transitory machine readable storage medium of claim 9, wherein the instructions cause the processor circuitry to at least cause ones of colors to be emitted from the ones of backlights, the ones of colors indicating the charge level of the battery.

14. The non-transitory machine readable storage medium of claim 9, wherein the instructions cause the processor circuitry to at least:
compare the charge level of the battery to a critical charge level threshold; and
cause the display of the charge level of the battery with the ones of backlights emitting at least one alternate color after the critical charge level threshold is satisfied.

15. The non-transitory machine readable storage medium of claim 14, wherein the instructions cause the processor circuitry to at least:
detect whether a lid of the mobile device has opened; and
compare the charge level of the battery to the critical charge level threshold after the lid of the mobile device has opened.

16. The non-transitory machine readable storage medium of claim 9, wherein the instructions cause the processor circuitry to at least activate the ones of backlights by closing a circuit between a power source and the ones of backlights.

17. A method, comprising:
detecting a battery charge level display event on a mobile device, the mobile device in a pre-boot state;
determining a charge level of a battery of the mobile device; and
after the battery charge level display event, causing a display of the charge level of the battery in the pre-boot state with ones of backlights of ones of keys on a keyboard.

18. The method of claim 17, wherein the ones of keys are a first ones of keys, and wherein detecting a battery charge level display event includes detecting a pattern of a second ones of keys on a keyboard of the mobile device have been pressed.

19. The method of claim 17, including causing a blinking pattern with at least one of the ones of backlights.

20. The method of claim 17, wherein the ones of keys on the keyboard include at least one number key indicating a percentage of the charge level.

21. The method of claim 17, including causing ones of colors to be emitted from the ones of backlights, the ones of colors indicating the charge level of the battery.

22. The method of claim 17, including:
comparing the charge level of the battery to a critical charge level threshold; and
causing the display of the charge level of the battery with the ones of backlights emitting at least one alternate color after the critical charge level threshold is satisfied.

23. The method of claim 22, including:
detecting whether a lid of the mobile device has opened; and
comparing the charge level of the battery to the critical charge level threshold after the lid of the mobile device has opened.

24. The method of claim 17, including activating the ones of backlights by closing a circuit between a power source and the ones of backlights.

\* \* \* \* \*